July 6, 1943. C. W. BAIRD 2,323,440
ELECTRICAL CONTROL SYSTEM
Filed April 25, 1942
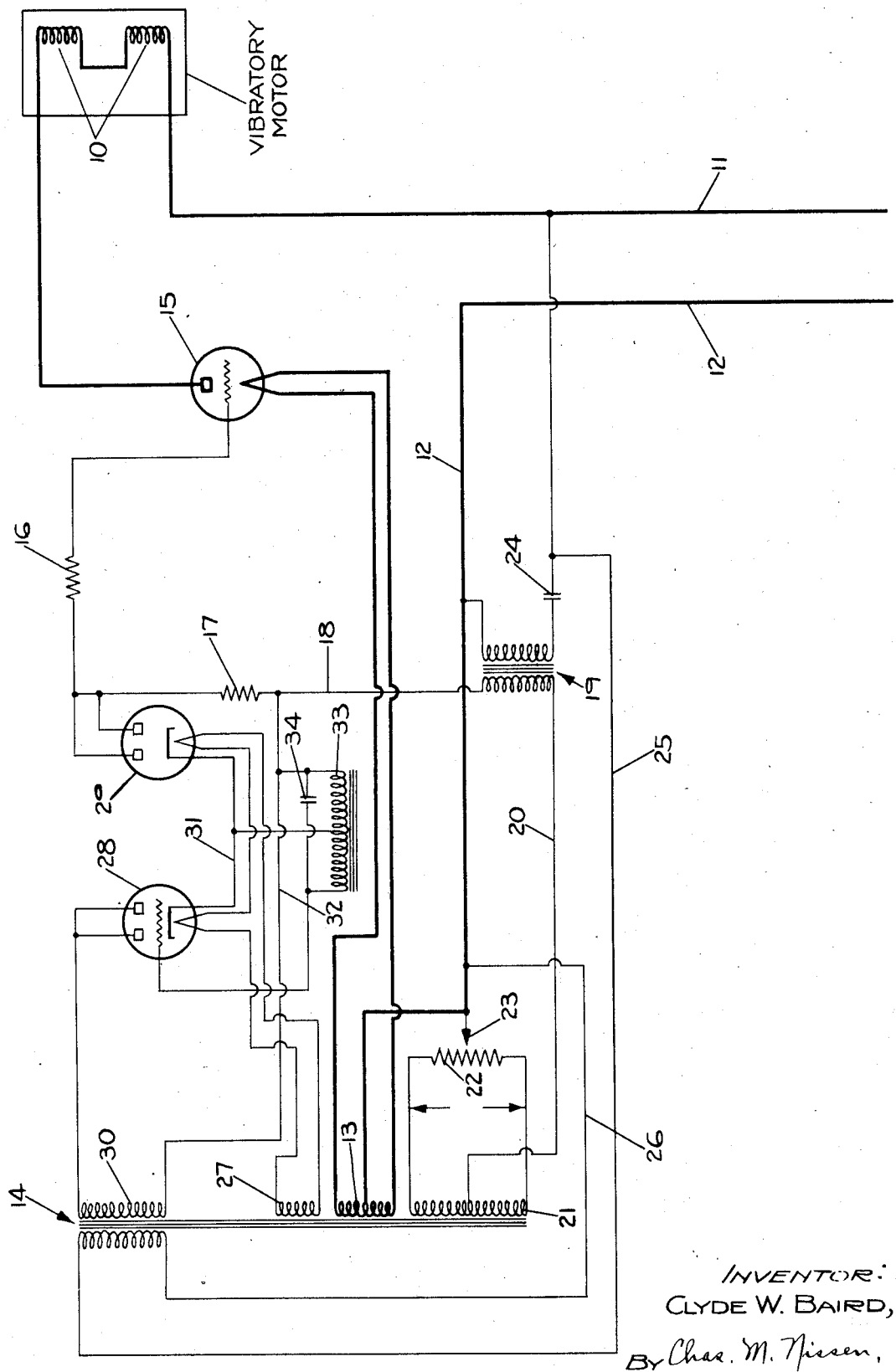
INVENTOR:
CLYDE W. BAIRD,
By Chas. M. Nissen,
ATT'Y.

Patented July 6, 1943

2,323,440

UNITED STATES PATENT OFFICE 2,323,440

ELECTRICAL CONTROL SYSTEM

Clyde W. Baird, Columbus, Ohio, assignor to The Traylor Vibrator Company, a corporation of Colorado Application April 25, 1942, Serial No. 440,507

4 Claims. (Cl. 172—240)

This invention relates to an electrical control system and an object of the invention is to provide an improved system for controlling the frequency of impulses delivered to a vibratory electro-magnetic motor either alone or in combination with means to control the amplitude of vibration thereof.

Other objects of the invention will appear hereinafter, the novel features and combinations being set forth in the appended claims.

In the accompanying drawing, the single figure is a wiring diagram of the system comprising my invention.

Electro-magnetic motors have been employed as parts of vibratory screens, feeders, conveyors, barrel packers and the like, and one illustration of such a motor in connection with a screen is found in the patent to James A. Flint, No. 2,153,243, dated April 4, 1939. Another illustration of such a motor in connection with a vibratory feeder is found in the patent to Earle V. Francis, No. 2,161,342, dated June 6, 1939, which illustrations are two of the many structures which embody such vibratory motors. When such motors are employed to vibrate relatively heavy masses, in other words, when the vibratory decks of screens, conveyors and the like, are relatively heavy, it is generally desirable to reduce appreciably the frequency of vibration thereof below that which would be produced if the vibratory motor were energized directly from a source of alternating current having a frequency such as 60 cycles, which is generally that commercially available.

Numerous devices have been used to reduce by a half the frequency of vibration of such motors compared to what it would be if energized from the raw alternating current but this reduction is sometimes inadequate, particularly where the decks are heavy, as above mentioned. For example, if a vibratory motor of the type illustrated in either of the above mentioned patents is energized from raw or straight alternating current the deck will vibrate at twice its frequency or 7200 cycles per minute, if the source has a frequency of 60 cycles per second. By employing a rectifier or by employing "mixed current" the frequency of vibration can be made the same as that of the frequency of the source.

In the system of my invention the frequency of the impulses delivered to the vibratory motor is a submultiple of the frequency of the source of alternating current and, for example, may be one-half, one-third, etc. As a typical illustration, impulses having a frequency of 30 cycles per second may be delivered to the vibratory motor from a 60 cycle source, thus producing vibration of the said vibratory motor at a frequency of 30 cycles per second or 1800 vibrations per minute. In the accompanying drawing I have shown a system to produce the above desired results which also includes as a desirable, though not an essential, part thereof means for controlling or adjusting the amplitude of vibration of the vibratory motor which is very simple and inexpensive.

Referring to said drawing, it will be seen that I have provided a vibratory motor, so designated therein, which may have the construction of either of the above mentioned patents. Said vibratory motor includes a field coil 10 supplied with current from an alternating current source, not shown, from which extend main line conductors 11 and 12. Conductor 11 is connected directly to one terminal of the field coil 10 of said vibratory motor. Conductor 12 extends to the center tap of a secondary winding 13 of a transformer 14, the outer terminals of which winding extend to the cathode or filament of a three electrode electron discharge power tube 15, preferably of the gaseous type, the plate or anode of which is connected to the other terminal of the field coil 10.

The circuit above described comprises the power circuit for the vibratory motor and includes as an important part thereof the power tube 15. If no control were provided for the control electrode or grid, or, in other words, for the input or grid-cathode circuit of the tube 15, it is evident that it would act as a half-way rectifier and deliver direct current impulses to the winding 10 at a frequency corresponding to the frequency of the alternating current delivered to conductors 11 and 12. In other words, if the frequency of the alternating current were 60 cycles, the frequency of vibration of the motor would also be 60 cycles. To reduce this frequency of vibration to one-half, one-third, one-fourth, etc., and also to provide means to control the amplitude of vibration thereof, I provide additional control mechanism now to be described.

The grid or input circuit of the tube 15 may be traced as extending from the grid thereof through current limiting resistor 16, frequency controlling resistor 17, then by way of conductor 18, to the secondary of a transformer 19, then by conductor 20 to the center tap of a secondary 21 of transformer 14, then through conductors connected to the outer terminals of said secondary 21 across which is connected a resistor 22 with which is associated a variable tap 23 which is connected to conductor 12, which as previously described, leads to the center tap of secondary winding 13 the outer terminals of which are connected to the cathode or filament of tube 15. It may be stated that the voltage produced across resistor 17 is employed to control the tube 15 to determine the frequency of the impulses delivered to the vibratory motor and the resultant of the voltages developed in transformer 19 and the superposed voltage determined by the position of the tap 23 operates by the phase shift method to determine the current flowing in the plate or output circuit of the tube 15 and through the field coil 18 of the vibratory motor.

This amplitude control apparatus will be described first. The primary of transformer 19 is connected across conductors 11 and 12, through a phase shifting condenser 24, and said transformer 19 and condenser 24 act so that the voltage produced on the secondary of transformer 19, which is superposed on the grid circuit of tube 15, preferably lags by substantially 90 degrees the voltage on conductors 11 and 12, or, in other words, the plate or output voltage of tube 15. It is evident that the voltage which is added to this alternating current voltage by virtue of the secondary 21 and tap 23 can be varied in phase relation by substantially 180 degrees. For example, if the tap 23 is in the central position as illustrated, the voltage superposed on said grid circuit by said secondary 21 and resistor 22 will be substantially zero. If the tap 23 is moved to the bottom position it will have one maximum value and a phase relation which is 180 degrees different from what the phase relation would be if said tap were moved to the topmost position. In other words, by moving the tap 23 from one of its extreme positions to the other, the voltage superposed on the grid circuit of the secondary 21 and resistor 22 may be shifted substantially 180 degrees. This voltage when added to the 90 degrees lagging voltage produced by the transformer 19 and condenser 24, is sufficient so that the resultant of the two voltages produced by these two combinations which is superposed on the grid circuit of tube 15 may shift said grid voltage so that it is substantially entirely in phase with the plate voltage, thereby producing maximum current flow to the vibratory motor and maximum amplitude of vibration, or said grid voltage may be shifted substantially 180 degrees out of phase with respect to said plate voltage to produce substantially zero current flow. In short, by shifting the position of the tap 23, the amplitude of vibration of the vibratory motor may be adjusted to any value from zero to a maximum.

It may be stated that the frequency control is effected by producing a pulsating direct current voltage on resistor 17, the pulsations having a frequency which is a sub-multiple of the frequency of the source of alternating current, and whenever this voltage is present on said resistor 17 it produces a sufficient negative bias so that the tube 15 will be non-conducting. If this pulsating voltage on resistor 17 has a frequency of 30 cycles per second that would be the frequency of the vibrations of the vibratory motor. Any other sub-multiple frequency on resistor 17 will produce a similar sub-multiple frequency of vibration of said vibratory motor. To produce this frequency control direct current pulsating voltage across resistor 17 I employ a circuit, now to be described.

Branching from conductors 11 and 12 are conductors 25 and 26 which connect to the primary winding of transformer 14 and thus energizes this transformer. In addition to the two secondaries of said transformer which were previously described it includes two additional secondaries, one secondary 27 providing filament current for two indirectly heated cathode vacuum tubes 28 and 29, the first of which is an oscillator tube and the second of which is a rectifier tube. Another secondary 30 of said transformer 14 produces a source of plate voltages for the tubes 28 and 29. The plate or output circuit of said tubes 28 and 29 may be traced from the top of said secondary 30 to the two plates of oscillator tube 28 in parallel, then to the cathode of said tube 28, then by way of conductor 31 to the cathode of rectifier tube 29, then to the two plates of tube 29 which are connected in parallel to one terminal of resistor 17. The circuit is completed through resistor 17, the other terminal of which is connected to conductor 32 which leads to the bottom terminal of said secondary 30. The tube 28 is part of an oscillating generator which is provided by connecting the grid thereof to one terminal of a tuned circuit formed by inductance 33 and condenser 34 connected in parallel. The other terminal of the tuned circuit 33, 34 is connected to conductor 32. The center tap of the inductance 33 is connected to conductor 31. This provides the necessary tuned circuit in the grid-cathode or input circuit of tube 28 to produce an oscillating generator in a manner well understood in the art. The tuned circuit is tuned substantially in resonance with a sub-multiple of the voltage produced on secondary 30 which, of course, has the same frequency as that on conductors 11 and 12. As a consequence the oscillator including the tube 28 and tuned circuit 33, 34 will oscillate at this sub-multiple frequency which may be one-half, one-third or one-fourth, etc., of the frequency of the applied or plate voltage. As is well known, there is a tendency for an oscillator to lock in at a sub-multiple frequency where the tuned circuit is tuned approximately or exactly to said sub-multiple frequency. Consequently the current flowing through the rectifier 29 will be rectified, and pulsating direct current flowing through winding 13 will produce a pulsating direct current voltage across the terminals of said resistor 17 which will have the said sub-multiple frequency.

As previously pointed out, this sub-multiple frequency direct current pulsating voltage on resistor 17 will control the frequency of discharge of the power tube 15 and consequently will control the frequency of the vibratory motor.

In operation of the system, pulsating direct current impulses will be delivered to the coils 18 of the vibratory motor at a sub-multiple frequency determined by the tuning of the tuned circuit 33, 34. This may be set at any value and preferably once it is set is fixed, because the vibratory motor is preferably tuned to a frequency at least near to, if not exactly, in resonance with the frequency of the impulses delivered to said field coil 18.

The amplitude of vibration of the vibratory motor is readily controlled by the simple expedient of adjusting the variable tap 23 which adjusts the phase relation of the alternating current voltage on the input circuit of tube 15 with reference to the output circuit thereof, thus producing a phase shift type of current control for said tube 15.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. In an electrical control system, the combination with a vibratory electro-magnetic motor, of a source of alternating current, means for supplying pulsating current to said motor from said source, said pulsations having a frequency which is a sub-multiple of the frequency of said source, said means including an oscillation generator energized from said alternating current source and including a tuning circuit tuned to a sub-multiple of the frequency of said source, means for rectifying the output of said oscillator to produce a pulsating voltage having a frequency which is determined by said tuned circuit at a sub-multiple of the frequency of said source, a power circuit for said motor including said source of alternating current and a power electron tube having a control electrode, means whereby said control electrode is controlled by said pulsating voltage to control the frequency of current impulses delivered by said power tube to said motor, and means for controlling the amplitude of vibration of said motor including mechanism to provide alternating current voltage on said control electrode which is shiftable in phase relation to said source of alternating current.

2. In an electrical system, the combination with a vibratory electro-magnetic motor, of a power circuit therefor including a source of alternating current and a power electron discharge tube having a control electrode, circuit means for imposing an alternating current voltage on the control electrode of said power tube, means for varying the phase relation of said imposed voltage relative to said source of alternating current to control the amplitude of vibration of said motor, and means for also imposing on said control electrode a frequency controlling pulsating direct current voltage having a frequency which is a sub-multiple of the frequency of said source of alternating current.

3. In an electrical system, the combination with a vibratory electro-magnetic motor, of a power circuit therefor including a source of alternating current and a power electron discharge tube having a control electrode, circuit means for imposing an alternating current voltage on the control electrode of said power tube, means for varying the phase relation of said imposed voltage relative to said source of alternating current to control the amplitude of vibration of said motor, and means for also imposing on said control electrode a frequency controlling voltage having a frequency which is a sub-multiple of the frequency of said source of alternating current.

4. An electrical control circuit including an oscillation generator, a source of alternating current for energizing said generator, said generator including a tuned circuit tuned to a sub-multiple of the frequency of said alternating current and connected to said oscillation generator, and means including a rectifier for producing direct current impulses from said source of alternating current having a frequency determined by said tuned circuit.

CLYDE W. BAIRD.